US011283677B2

(12) United States Patent
Wood et al.

(10) Patent No.: US 11,283,677 B2
(45) Date of Patent: *Mar. 22, 2022

(54) MAINTAINING EDIT POSITION FOR MULTIPLE DOCUMENT EDITOR

(71) Applicant: HEWLETT PACKARD ENTERPRISE DEVELOPMENT LP, Houston, TX (US)

(72) Inventors: Frank Wood, Elk Grove, CA (US); Kevin Tajeran, Roseville, CA (US); Gurraj Atwal, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 328 days.

This patent is subject to a terminal disclaimer.

(21) Appl. No.: 16/213,661

(22) Filed: Dec. 7, 2018

(65) Prior Publication Data
US 2020/0186418 A1 Jun. 11, 2020

(51) Int. Cl.
*H04L 12/24* (2006.01)
*G06F 40/16* (2020.01)
(Continued)

(52) U.S. Cl.
CPC .......... *H04L 41/0813* (2013.01); *G06F 40/16* (2020.01); *G06F 40/166* (2020.01);
(Continued)

(58) Field of Classification Search
CPC . H04L 41/0813; H04L 41/0843; H04L 41/22; G06F 40/166; G06F 40/16; G06F 40/205
(Continued)

(56) References Cited

U.S. PATENT DOCUMENTS 7,949,938 B2 5/2011 Champion et al.
9,021,424 B2 4/2015 Acker et al.
(Continued)

FOREIGN PATENT DOCUMENTS

EP 1685555 B1 * 1/2009 ............. G06F 40/30

OTHER PUBLICATIONS

Editing Multiple Documents, (Web Page), Retrieved Sep. 11, 2018, 1 Pg.
(Continued)

*Primary Examiner* — Zi Ye
(74) *Attorney, Agent, or Firm* — Nolte Lackenbach Siegel

(57) ABSTRACT

Disclosed techniques provide a view and edit function to simultaneously view and edit multiple network device configurations. The techniques may include, parsing a plurality of different network device configuration documents (e.g., files representative of configuration settings). Parsing may then identify a set of slots and anchor points relative to locations of related parameter settings within each of the different network device configuration documents (e.g., a document per device). The slots may indicate a type of parameter setting and the anchor points indicating a relative location within a specific device configuration representative document. As a user makes a change to a parameter value, at least two files of the different network device configuration documents within a scope of an editing session may be identified to receive the change. Reverse mapping may be provided (e.g., by slots and anchor points) to properly implement this change for each different device.

20 Claims, 11 Drawing Sheets

(51) Int. Cl.
   *G06F 40/166*   (2020.01)
   *G06F 40/205*   (2020.01)
   *H04L 41/0813*  (2022.01)
   *H04L 41/22*    (2022.01)
   *H04L 41/084*   (2022.01)

(52) U.S. Cl.
   CPC ........ *G06F 40/205* (2020.01); *H04L 41/0843* (2013.01); *H04L 41/22* (2013.01)

(58) Field of Classification Search
   USPC ......................................................... 709/220
   See application file for complete search history.

(56)                References Cited

U.S. PATENT DOCUMENTS

2002/0178246 A1\* 11/2002 Mayer .................... H04L 41/12
                                                            709/223
2009/0214241 A1   8/2009 Kawaguchi et al.
2009/0216867 A1\* 8/2009 Pusateri ................ H04L 41/085
                                                            709/222
2015/0012528 A1   1/2015 Kapadia

OTHER PUBLICATIONS

Moving Through Documents, (Web Page), Retrieved Sep. 11, 2018, 5 Pgs.

\* cited by examiner

MAINTAINING EDIT POSITION FOR MULTIPLE DOCUMENT EDITOR

CROSS-REFERENCE TO RELATED CASES

This case is related to U.S. patent application Ser. No. 16/213,652, now U.S. Pat. No. 11,115,279, issued Sep. 7, 2021, entitled, "Client Server Model for Multiple Document Editor," filed on the same date as this application by Frank Wood, et al. This case is also related to U.S. patent application Ser. No. 16/213,074, now U.S. Pat. No. 11,210,466, issued Dec. 28, 2021 entitled, "Multiple Document Editor Using Rules for a Restricted Language" filed on the same date as this application by Frank Wood, et al. This case is also related to U.S. patent application Ser. No. 16/213,795, entitled, "Error Detection and Correction for Multiple Document Editor," filed on the same date as this application by Frank Wood, et al.

BACKGROUND

Today's infrastructure networks are becoming more and more complicated and including ever increasing numbers of devices with network capabilities. One side-effect of adding a large number of connected devices is the infrastructure networks (e.g., corporate private networks) become more complicated and may require additional, network support devices such as routers, bridges, domain name servers, network time protocol (NTP) servers, gateways, etc. Each of these network support devices generally requires a configuration of network parameters to function in the network architecture. In some cases, network devices require consistency for certain network parameters (e.g., Internet Protocol (IP) address of an NTP server). For example, if there is a single NTP server within a given network, then all devices on the network should be configured to point to the single NTP server to have a consistent time reference. In other cases, there may be different levels of security configurations for different devices, for example to support a secure subnet, that is partitioned from standard network communication traffic, within a lager network infrastructure. Accordingly, certain devices have different values for the same configuration parameter setting as other devices not involved with (or allowed access to) the secure subnet. Simply put, there are situations when configuration parameter settings are desired to be identical and other situations where the same configuration parameter settings have a different value for selected network devices.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not use serial processing and therefore may be performed, in an order different than shown or possibly in parallel with each other. For a detailed description of various examples, reference will now be made to the accompanying drawings, in which.

DETAILED DESCRIPTION

Figure 1A:
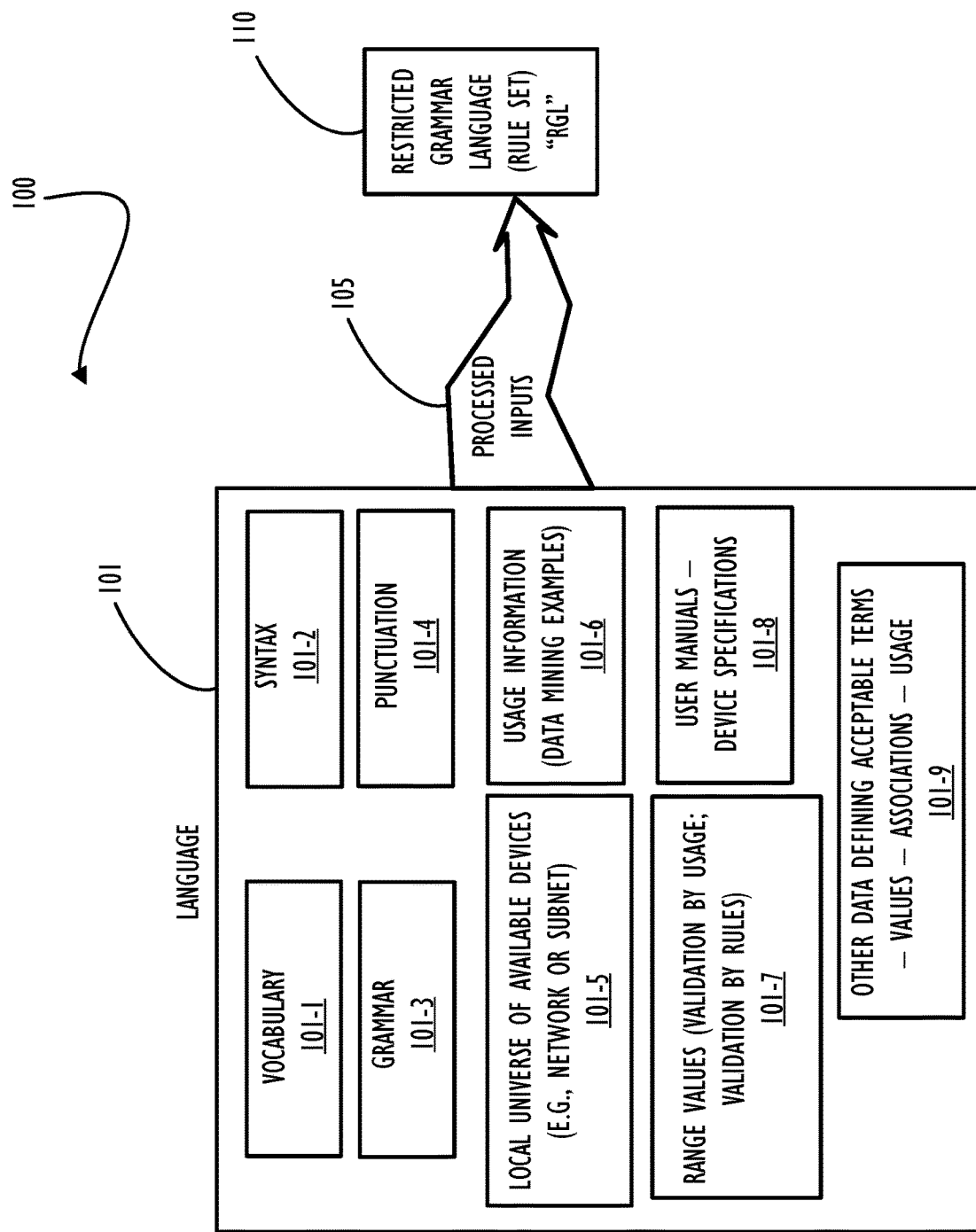
FIG. 1A is a block diagram representing an example logical breakdown of language and available data sources used to illustrate one possible technique for generating a restricted grammar language (RGL) rule set for use in editing multiple related input documents (e.g., that correspond to a network device configuration), according to example implementations of this disclosure.

Illustrative examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g. for a customer in that customer's isolated instance).

As used in the examples of this disclosure there are computing devices referred to as either client devices and server devices. Depending on the context of the use of the terms "client" and "server," these terms may not refer to a capability classification of the underlying hardware. Further, client devices should not be confused with a client application of a server-based application (or distributed application). In certain uses, client devices may represent devices in a client-server architecture rather than providing any indication of machine specifications and capabilities. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network support devices such as routers, bridges, domain name servers, NTP servers, gateways, etc, have a configuration of network parameters in order to function in a network architecture.

Historical methods for maintaining network device parameters are largely manual with limited automation and maintenance capabilities available to system administrators. For example, some system administrators create templates to store base values for configuration settings used to configure a new device, implement scripted methods to apply bulk changes of data to network devices, or utilize standard multi-file differencing utilities. While providing some perceived assistance, templates easily become outdated. As a result, a change to a value representing a configuration setting in a template might have initiated an effort (possibly manual) to determine which network devices had already been configured based on the now outdated template. Automated bulk changes may be additionally problematic. For example, if an error was introduced in bulk, the network may be crashed and be difficult to restore.

Computer assisted interrogation of a large number of files may also be hampered, in part, because existing multi-file diff utilities (utilities that compare multiple input files to identify differences) may not handle sufficient inputs because of design limitations for those utilities, Specifically, most multi-file diff utilities are limited and focus on a very few parallel instances of files (e.g., mostly 2 and sometimes 3 files but rarely more). Overall, these approaches do not provide a comprehensive solution for network administrators. Further, because of the manual nature and overall complexity, these approaches often result in inadvertent incorrect settings being configured for devices within a network infrastructure. Incorrect configuration settings cause undesired network performance, or even network failure. Accordingly, setting or adjusting configuration parameters of network devices may benefit from disclosed techniques to manage a large number (e.g., many independent instances) of related, but not identical, configuration files.

In modern corporate networks, most network devices are dedicated switches, routers, or bridges, however, server computers may be configured to perform functions of a network device and may be used in that manner by smaller entities. The concepts of this disclosure are not limited to dedicated network devices, as they apply to existing devices configured to support networking functions.

In practice, there may be hundreds of network devices within an actual network configuration domain of a large corporation or enterprise. Each device will have a functional configuration that allows the device to operate within the network. Many devices may have configurations that are very similar for a set of devices that may be logically grouped in a network. Groupings may include, for example, common function, physical connectivity, or naming conventions. As an example, consider several subnets that may be connected together through a common router. The router may have multiple network interfaces each having a different IP address and each subnet may be connected to one network interface. Each device in, a subnet may be configured to route traffic through the common router but will contact the router on the IP address where the subnet is connected to the router. Configuration of each device on the subnet, though similar, (e.g., having a default route to the common router) will have at least one minor difference between them. Specifically, each device may have a unique IP address that is suitable for the subnet where the device is connected (either physically or wirelessly) to the network.

When taken at a high level, one example implementation of this disclosure describes methods and systems where edits to statements in a plurality of network device configuration documents may be merged with other documents having similar configuration statements. This allows a network administrator to manage changes to configurations of a large number of network devices. In a first example implementation, multiple input files representative of configuration settings for distinct network communication devices may be parsed and placed into a position within a scaffold based on a structured grammar definition (e.g., defined ahead of time as opposed to the RGL which may be generated as discussed later). Using the structured grammar definition, a scaffolding may be built.

Once the scaffolding is in place, each individual file (e.g., representative of a network device) may be parsed and its information (e.g., configuration settings) may be placed into the correct location of the scaffold along with each other file provided as input. A final view may be determined by the populated branches of the scaffold and the rules used to merge each branch of the scaffold. Thus, based on this final scaffold view outlier data (e.g., settings that are not in conformance with other (or a majority of other) network configuration devices) may be easily identified. For example, if a single (or few) network configuration settings are different from other settings across the set of input files, a new slot in the scaffold would be created and have a back reference to very few (or a single) network device. Accordingly, depending on the type of configuration setting (as may be highlighted in the structured grammar definition) an outlier value may be suspect and initiate further investigation. Using the disclosed scaffold view, a system administrator may "at a glance" determine which parameter settings are not consistently applied across the scope of their network used to populate the scaffold view (e.g., network wide, for a particular subnet, or for a particular device type (or set thereof)).

In this example, an update to the scaffolding rules may be updated and input files parsed again to create an updated view. Using this scaffolding approach, a command line interface (CLI) and scripting automation may be made available to users that may be more comfortable with a CLI interface rather than an interactive interface (e.g., the multi-edit interface described below). Further, the grammar scaffold may allow the ability to track merges and apply edit changes via a CLI interface. Discussed further below are anchor points within multiple documents that allow an interactive editor to maintain relative file location information. However, an overall scaffolding structure may be more amenable to CLI interactions. In any case, the concepts are similar in that they both allow edit changes to be back propagated from a single view to multiple source files based on a change from a system administrator. In short, a scaffolding may allow a single comprehensive view across a plurality of network devices and present information so that similarities and differences of individual device configurations may be easily perceived. The structured grammar used to populate the scaffolding may also be utilized via CLI commands to affect updates to specific configuration settings across one or more underlying devices.

Other example implementations of this disclosure provide rule sets for validation of configuration edits at different points in a development life cycle for network administration changes. In one example, an editor may be augmented with information from an RGL rule set to provide just-in-time correction (or suggestions) while a network administrator is editing configuration parameters for multiple devices simultaneously. As used herein, "RGL" may be used as a shorthand that refers to the disclosed RGL rule set including structure rules, machine learning information, and data mining information as explained with reference to FIG. 1A below. Just-in-time in this context may also be explained using a simple use-case example. That is, while the network administrator is actively interacting with an editor (e.g., computer process facilitating multi-edit capabilities described herein), the editor may automatically validate entries or provide suggested entries based on information available in the RGL. The suggestions and validations may be derived from all available information used to generate the disclosed RGL (See FIG. 1A).

As will be appreciated, the potentially complex network environment and number of devices in a corporate network each introduce a variable that affects how a network administrator may manage a large number of network devices. Each network device has some form of configuration that may be as simple as the name of the device, but often configuration of a network device includes an unpredictable combination of configuration parameters of varying complexity. Accordingly, disclosed implementations represent improvements to the art of system administration generally and specifically network administration that allows for a network administrator to manage multiple configuration files concurrently and possibly use an enhanced network and domain aware editor to do so.

To efficiently allow a network administrator to describe their desired configuration parameters, a technique for automatically defining an RGL, possibly with different levels of scope, has been created. In the context of network device administration, different levels of scope refer to different portions of the network. That is, some ranges, values, available devices, etc. may be applicable to a portion (e.g., subnet or set of like devices) of an overall corporate network. The automatically generated (and possibly scoped) RGL may allow a network administrator to edit configuration settings across a set of devices (i.e., multi-edit concurrently) and have appropriate "expert advice" available while the editing session is taking place. Further, this available expert advice (e.g., that is derived from the RGL) may be used to validate proposed changes and warn against implementation of potentially damaging configuration changes. In a simple form, the RGL may be used to prevent a typographical error to a parameter setting (or an out of range value) from being deployed on a network. In any case, the disclosed multi-edit and concurrent application of changes across multiple devices simultaneously may provide an ease-of-use benefit by allowing a single interface point for a comprehensive set of network configuration changes.

In one example implementation, changes made by a network administration to a single editing interface are automatically integrated, based on appropriate anchor points, into their respective locations (which may be different per configuration document) for each device associated with a particular multi-edit session. The multi-edit processing may create a change document per network device based on the instructions provided in the multi-edit session for changes to the network configuration. As will be apparent, when the number of network devices is quite large, changes that need to be applied to multiple network devices translates into changes that need to be made to the configuration document for each device. Multiple configuration documents may become quite difficult to manage considering the number of devices, personnel changes overtime, and multiple people making ad hoc changes. Accordingly, providing a single change interface such as the disclosed multi-edit, network aware (e.g., RGL expert knowledge base), and position aware (anchor points) technique for implementing changes represents an improvement to the art of network administration. Other technical areas, in addition to network administration, may also benefit from the disclosed techniques of managing multiple related files concurrently and this disclosure is not intended to be limited to network device configuration files. For example, managing source code files across multiple related branches of a source code repository to implement a global change (or change of other scope) may similarly benefit from disclosed multi-edit techniques. Other applications of these techniques are also possible.

Having an understanding of the above overview, this disclosure will now explain a non-limiting but detailed example implementation. This example implementation is explained with reference to the figures and includes: a block diagram representing an example logical breakdown of a language and available data sources used to illustrate one possible technique for generating an RGL (e.g., rule set with metadata and domain knowledge) for use in editing multiple related input documents (e.g., that correspond to network device configuration) (FIG. 1A); an example group of network device configuration documents managed using the techniques in this disclosure (FIG. 1B); the example group of network device configuration documents from FIG. 1B having example anchors assigned to track changes of similar statements across multiple managed documents (FIG. 1C); an example of changes made to a statement in a network device configuration document merging to similar statements in another document (FIG. 2); an example process illustrating the validation and slot ordering of statements following an RGL paradigm (FIG. 3); an example computing device with a hardware processor and accessible machine-readable instructions that might be used to compile and execute a program implementing the validation and slot ordering of statements following an RGL paradigm (FIG. 4); an example block diagram of a corporate network where multiple devices have similar configurations (FIG. 5); an example of network device configuration documents (FIG. 6); a block diagram of a client-server editing capability to optimize a client device by providing server-side support for a multi-edit capability as disclosed herein where the client device leverages functionality of the server-side multi-editor to provide end-user functionality for editing multiple configuration documents simultaneously (FIG. 7); an example group of computers and interconnections between computers that may be used as part of the compilation or execution of the disclosed network device configuration document management techniques (FIG. 8); and an example processing device that may be used in one or more devices that may implement compilation or execution of the disclosed network device configuration document management techniques (FIG. 9).

Referring now to FIG. 1A, a block diagram 100 representing an example logical breakdown of a language and available data sources used to illustrate one possible technique for generating an RGL 110 (e.g., rule set) for use in editing multiple related input documents (e.g., that correspond to network device configuration), according to one or more disclosed implementations. As used herein, a restricted language refers to a language with a finite set of terms that does not evolve asynchronously with versions of software, hardware, and firmware. Thus, for a given set of releases of firmware, hardware, and software (each released independently) a comprehensive set of allowable terms may be derived. That comprehensive set of terms will be fixed until a new term may be introduced as part of a new version release of one or more of hardware, software, and firmware. Block diagram 100 illustrates language 101 and possible component attributes of a language. Arrow 105 illustrates that processing of language rules and available data sources may be used to process inputs and automatically generate an RGL 110. Different RGL 110 rule sets may be generated for different portions (e.g., subnets) of an enterprise network. For example, an RGL 110 for a secure subnet may have different configuration setting rules than a non-secure subnet within the same corporate enterprise network. Thus, there may be a hierarchy of RGLs 110 for some implementations that may be automatically adjusted based on the devices a network administrator defines (e.g., an editing scope) for a multi-edit session. RGLs 110 to be applied in a particular multi-edit session may be generated off-line or may be adjusted automatically based on which types of parameters a network administrator is changing (e.g., editing). Further, RGLs 110 may be applied just-in-time while the editing session is in progress or may be applied as a post edit validation (e.g., prior to deployment). In any case, RGLs 110 may be applied to prevent (or warn) a network administrator of any suspect changes made prior to impacting a network adversely.

Returning to FIG. 1A, language 101 is illustrated to include component parts that define a vocabulary 101-1 (e.g., set of valid words/terms), structure of language based on syntax 101-2, grammar 101-3, and punctuation 101-4. Further, additional information may be used to augment basic language rules to provide expert knowledge for an RGL 110. For example, local universe of available devices 101-5 represents a scoping capability to allow appropriate rules to be applied to editing changes based on which devices are selected for editing. That is, based on the devices corresponding to a multi-edit session such as a subnet or set of secure devices, a different RGL may be applied (or a hierarchy of RGLs). Usage information 101-6 indicates that data mining techniques may be applied across all available devices to detect consistency attributes that may be useful to identify an erroneous typographical error made during an editing session. In one implementation, usage information 101-6 extends beyond the scope of the current multi-edit session and may be maintained at a global scope to provide consistency information. Range values 101-7 indicate that certain parameters may have valid ranges for their configuration and, for example, an edit to change a value to be outside a valid range may represent a suspect editing action. Ranges may be based on locally defined information (e.g., the currently used ranges within a network) or may be based on rules defined by a network administrator. User manuals 101-8 represent that information about device specifications may be obtained from static sources and used to assist in validation (e.g., capability of a device may be specified in its device specification documents to not exceed a certain value for a given parameter). Other data 101-9 may also be used to define acceptable changes. For example, if a proposed change was to introduce a parameter setting that has not to-date been used within an enterprise environment, this may be an indication that an error has been made or at least that a suspect entry should produce an indication of warning via the editing session or validation prior to deployment. Further, a newly used association of related values or a usage of first impression to the network environment may represent a suspect edit that may initiate a warning. In general, if a user is editing a value to be "inappropriate" based on currently used values within the administration domain or to be inconsistent with design specifications of devices to be change, a warning may be helpful to prevent inadvertent alterations to a corporate network.

In general, a vocabulary 101-1 for a language may be thought of as the set of words that have definition (e.g., understood meaning) within that language. Over time, words may be added to or deleted from (although rarely) a vocabulary for a given language. In computer languages, words representing commands are often deprecated (retired) prior to being deleted (unsupported).

A syntax 101-2 is often associated with computer languages and may be thought of as a combination of grammar 101-3 and punctuation 101-4 as those are used in a natural language. Configuration files, much like computer languages used for programming, typically conform to a syntax. Simply put, configuration files typically have an understood structure.

Grammar 101-3 represents rules of association between words of a language with respect to their "proper" usage. Sometimes grammar rules are strict in that associations of words to each other may alter their meaning. That is, a word may take a particular meaning, selected from a set of valid alternative meanings, based on its context (e.g., position in a sentence or proximity to other words).

Punctuation 101-4 refers to non-alphanumeric symbols that may be used in sentences to provide segmentation and emphasis. In configuration files, punctuation characters may assist with conformance to syntax 101-2 rules and may allow for proper parsing when configuration information is interpreted for use.

Usage information 101-6 and validation based thereon may be performed, in part, by identifying similarities and differences across a local universe of available devices 101-5 (e.g., a scope). Additionally, a hierarchy of different levels of relationships may be determined and used as a weighting factor to determine if differences are expected or suspect. For example, suspect entries may have a typographical error where a value is different than expected or possibly a transposed set of numbers. In one example, a value for an NTP server may be a transposed address relative to all other devices within a subset of the network and may therefore be considered highly suspect (e.g., across all devices in a subnet one device has a transposed network address that would be consistent of not for the transposition).

Range values 101-7 may be helpful for validation of some configuration settings. For example, an internet protocol (IP) address may have valid values based on usage within an enterprise network (e.g., IP address range for subnet). Some parameters may additionally have values within ranges as supported by device specifications or software releases. Accordingly, inputs associated with this type of information, such as device user manuals 101-8 and software release notes, may be used to assist in validation of proposed changes.

Other data defining acceptable terms, values, associations, and usage (block 101-9) may also be utilized. For example, local rules definition files may define acceptable configuration parameter settings or locally applied ranges, etc.

Arrow 105 indicates that the above mentioned inputs may be processed to generate one or more RGLs to be used to augment the disclosed multi-editor implementations. Data examples and rules may be collected from all available sources (e.g., sources listed above and possibly others). Once collected, data may be processed using machine learning techniques, for example, and data may be mined using data mining techniques. Data analysis techniques may be applied to these inputs to produce a rule set for configuration file editing and validation. For simplicity of explanation, this disclosure refers to an RGL when referencing a restricted grammar language rule set generated to provide expert advice with respect to usage, syntax, conformity, and overall rules that may be used to validate proposed changes (e.g., in a multi-edit session). Note, that it is not always the case that an editing session be a multi-edit session to use an RGL and editing of a single configuration file may also benefit from disclosed validation techniques.

Figure 1B:
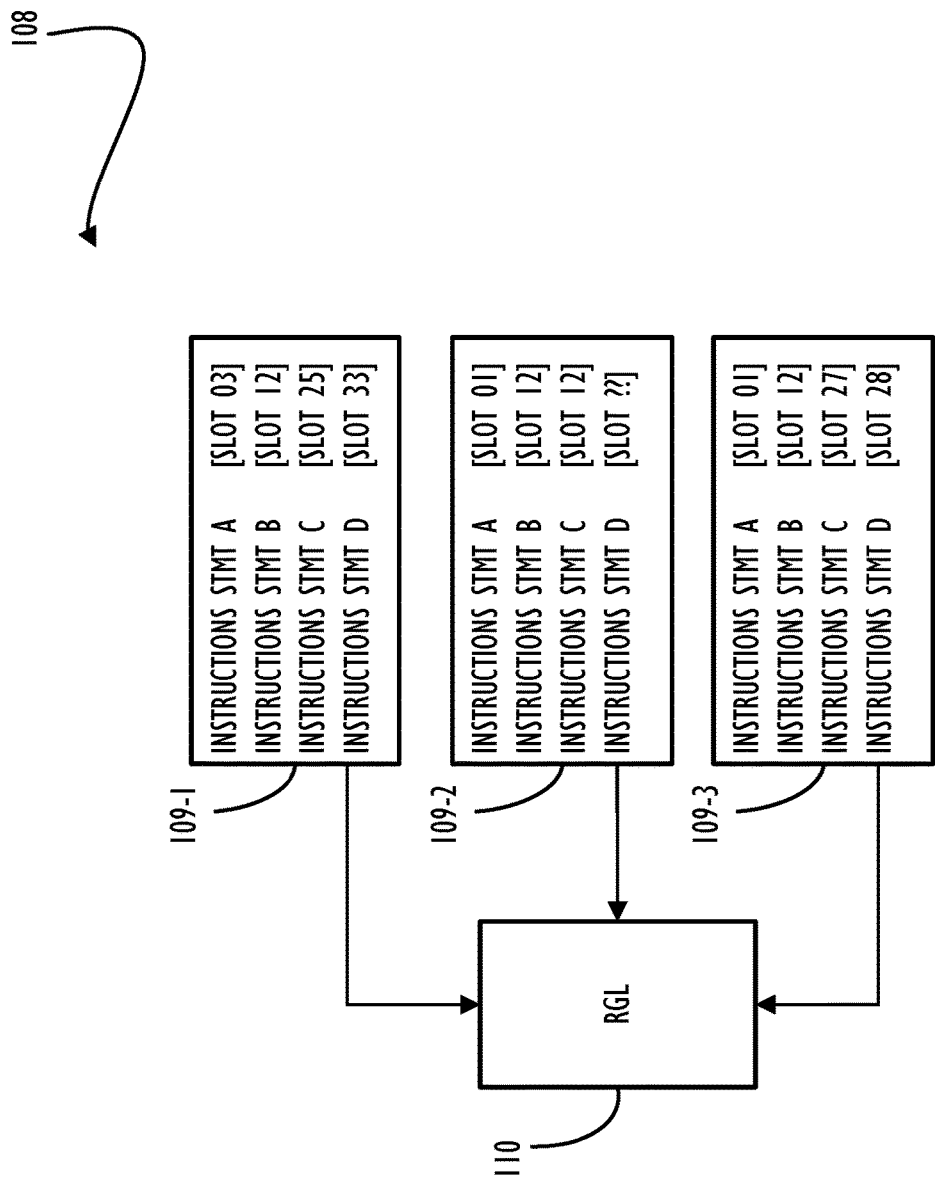
FIG. 1B is a functional block diagram representing an example group of network device configuration documents managed, according to example implementations of this disclosure.

Referring now to FIG. 1B, block diagram 108 illustrates a simplified case of multiple network device configuration documents 109-1 to 109-3. For the purposes of explanation here, three documents are shown but there is no limit to the number of documents that can be edited and merged utilizing the techniques in this disclosure. Each network device configuration document 109-1, 109-2, and 109-3 are each illustrated to contain multiple statements (e.g., configuration details such as a key/value pair for a parameter setting) that should conform to RGL 110 (and may be used as inputs to generate RGL 110). Block diagram 108 illustrates example documents with a limited number of statements for purposes of simplifying the example, but a document may contain any number of statements. In most cases, for a complex network device there may be a significant (e.g., thousands) of configuration settings possible.

The disclosed RGL may be generated with an understanding of a grammar that is used and recognize a defined syntax of the statements used in network device configuration documents. The syntax can be a combination of letters, numbers, whitespace, and symbols of any form appropriate to allow a human to express unambiguous instructions for how a computer may interpret a statement conforming to the syntax for any given purpose. In accordance with the examples, statements in this context are configuration instructions that may be interpreted by a network device for the purpose of changing how the device operates.

As explained above, RGL 110 represents a restricted grammar that associates syntax rules and contextual metadata with statements that may be used to aid in the interpretation and validation of the statement. The metadata may include information about how each statement is ordered for interpretation, indentation, or parent-child relationships between statements. These specific metadata items are intended as an example to illustrate the use of the grammar metadata and are not intended to limit the use of metadata to these examples.

Statements in each device configuration file 109 may be assigned an ordering "slot" based on metadata that is defined by RGL 110. The slot assigned to a statement may indicate an incremental order (e.g. Slot 1 is ordered before Slot 2, Slot 2 before Slot 3, and so on) that may be used when an interpreting program is processing the network device configuration document. The slot may alternatively indicate a position within a document relative to an anchor point with respect to statements in a document. In either case, the slot may not be restricted to a single statement. As briefly mentioned above, anchor points may be at different relative locations for different configuration files but a common anchor point across two documents may indicate that the configuration settings in that area of the document are the same (or similar) across different instances of the devices. In short, anchor points may be associated with an "area of interest" within a configuration file and the areas of interest may be further associated with a slot. Accordingly, editing parameter settings may provide an adjustment to values and the combination of slots, anchor points, and areas of interest may be used as a mapping to determine a location in each individual configuration file to apply the adjustment. The metadata in RGL 110 may also specify if a slot may contain a single statement or may contain multiple statements, for example, based on the types of configuration parameters at that location of a configuration file.

Still referring to FIG. 1B, an illustrative example of the statement slot assignment is illustrated in document 109-1 where the first statement "INSTRUCTIONS STMT A" is assigned to "Slot 03" as indicated in the diagram. The subsequent statements are each, in this example, assigned a further slot in accordance with metadata in RGL 110. IN this example, the use of A, B, C, and D for instruction statements reflects the order in which the statements appear within a given configuration file and not that the instruction statements are the same. That is, slots (and anchor points discussed below) are used in this example to group statements related to each other together across different files. To be clear, Instructions statement A in document 109-1 is not intended in this example to be the same type of instruction statement as Instruction statement A in document 109-2, the similarity implied in this example is that they are both the first sequential instruction statement in their respective documents.

As illustrated in document 109-2 where "INSTRUCTIONS STMT B" and "INSTRUCTIONS STMT C" are both assigned to ordering slot 12 there is an intended implication that each of these statements (along with "INSTRUCTIONS STMT B" in both configuration file 109-1 and configuration file 109-2) are related to each other with respect to a similar or the same configuration setting. This example also illustrates that multiple statements may be assigned the same ordering slot within a single document or across multiple documents. Also note, as indicated by documents 109-1 to 109-3 that a single document may not contain statements for all ordering slots. Document 109-1, for example, begins with a statement that is ordered in slot three but does not necessarily contain statements associated with slots one and two. The statements that would have been assigned to the missing slots may not have been relevant to the network device corresponding to the configuration recorded in document 109-1.

Document 109-2 further illustrates that statements may not be assigned an ordering slot. Specifically, as the diagram indicates "INSTRUCTIONS STMT D" of document 109-2 is illustrated with an ordering slot "Slot ??". Statements that are not assigned an ordering slot may or may not be valid according to RGL 110. Statements that are not assigned an ordering slot may be considered unmapped and may subsequently be ordered after the largest assigned ordering slot in the document (or be an indication of a suspect entry that should initiate a warning or error).

Figure 1C:
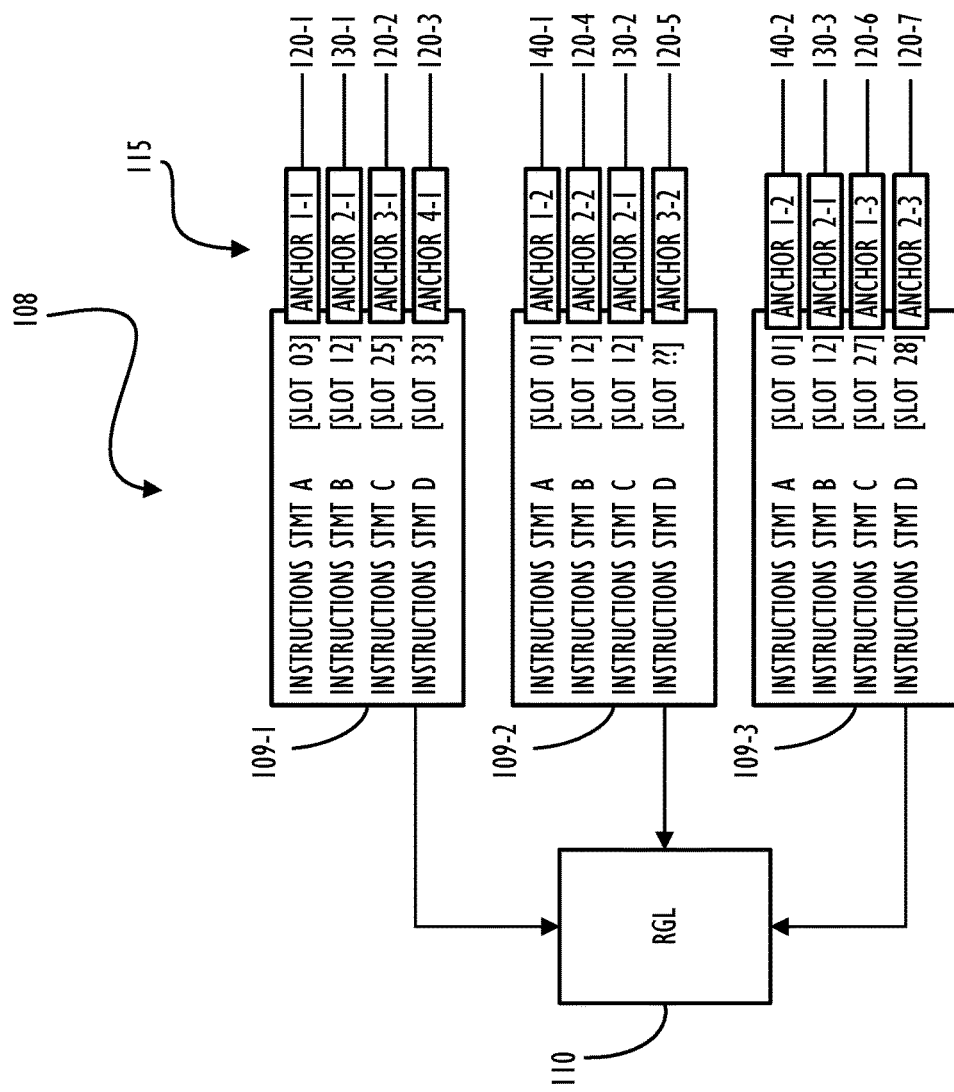
FIG. 1C is a functional block diagram representing the example group of network device configuration documents from FIG. 1B having example anchors assigned to facilitate merging changes of similar statements across multiple managed documents, according to example implementations of this disclosure.

Referring now to FIG. 1C, block diagram 108 from FIG. 1B has been extended to include anchor points 115 that may each be assigned to statement lines for the purpose of referencing similar statements across multiple configuration documents. Each configuration document 109 may correspond to a single network device to contain statements representing a specific configuration for the associated device. Each document that is managed using the techniques in this disclosure may be managed as part of a group of documents used to configure network devices that provide similar purposes (or that have similar configuration settings for different types of devices). Similar devices, in practice, typically have similar configurations within a given network domain. Having similar configurations may result in many documents having several similar statements that should be changed concurrently if any of these similar statements are changed in a single document. To illustrate this concept, consider anchor 2-1 as indicated by 130-1 in document 109-1, anchor 2-1 as indicated by 130-2 in document 109-2, and anchor 2-1 as indicated by 130-3 in document 100-3 that each reference a statement that has been assigned ordering slot 12 according to the example. Statements that are similar are identified as similar by assigning a matching anchor. Similar statements may have a matching ordering slot given statements follow RGL 110. Additionally, anchor 2-2 as indicated by 120-4 in document 109-2 is also assigned to slot 12 but has a different anchor point than other slot 12 statements. This may be an indication that for document 109-2 there are multiple sections of the document that contain information associated with slot 12 and therefore an edit to a configuration parameter associated with slot 12 may indicate that multiple locations within document 109-2 may need to be updated upon receipt of an editing command that changes a slot 12 parameter. In short, a combination of slots and anchor points may be used across multiple documents as a reverse mapping to determine how an editing change may need to be applied back to the original source documents.

Still further, statements having matching anchors to indicate similarity may not exist across all network device configuration documents. This concept is illustrated by anchor 1-2 as indicated by 140-1 in document 109-2 and anchor 1-2 as indicated by 140-2 in document 109-3 without a corresponding anchor 1-2 appearing in document 109-1. This may indicate that the network devices corresponding to the configuration documents 109-2 and 100-3 may have configuration elements that are irrelevant to the network device corresponding to the configuration document 109-1.

Statements may also be assigned an anchor that does not match an anchor in any other document as illustrated by anchors as indicated by 120-1 through 120-7 that are unique across the example set of three documents. Statements without anchors to matching statements in any other documents may represent configuration settings that are unique to a device and therefore have a single unique instance across all documents (e.g., a hostname may be unique within a network). Alternatively, unique statements may be temporarily unique and may later be matched with a statement in another document with a matching anchor if a new matching statement is added to another document. For example, if a new NTP server is added to a subnet and tested with a single device prior to having all other devices reconfigured to point to the new NTP server. Many different combinations are possible.

Anchors are given simple numbers for purposes of the example diagrams but may be assigned any type of identifier that is sufficient to uniquely identify an anchor (e.g., a hash or other identifying key). The ordering of anchors in a particular document may not have any relative significance within that document given the uniqueness of the anchor across multiple documents allows the anchor to be matched in any position of any other document as long as the corresponding areas of the two documents represent the same area of interest with respect to configuration settings appearing at their respective locations within those documents.

Figure 2:
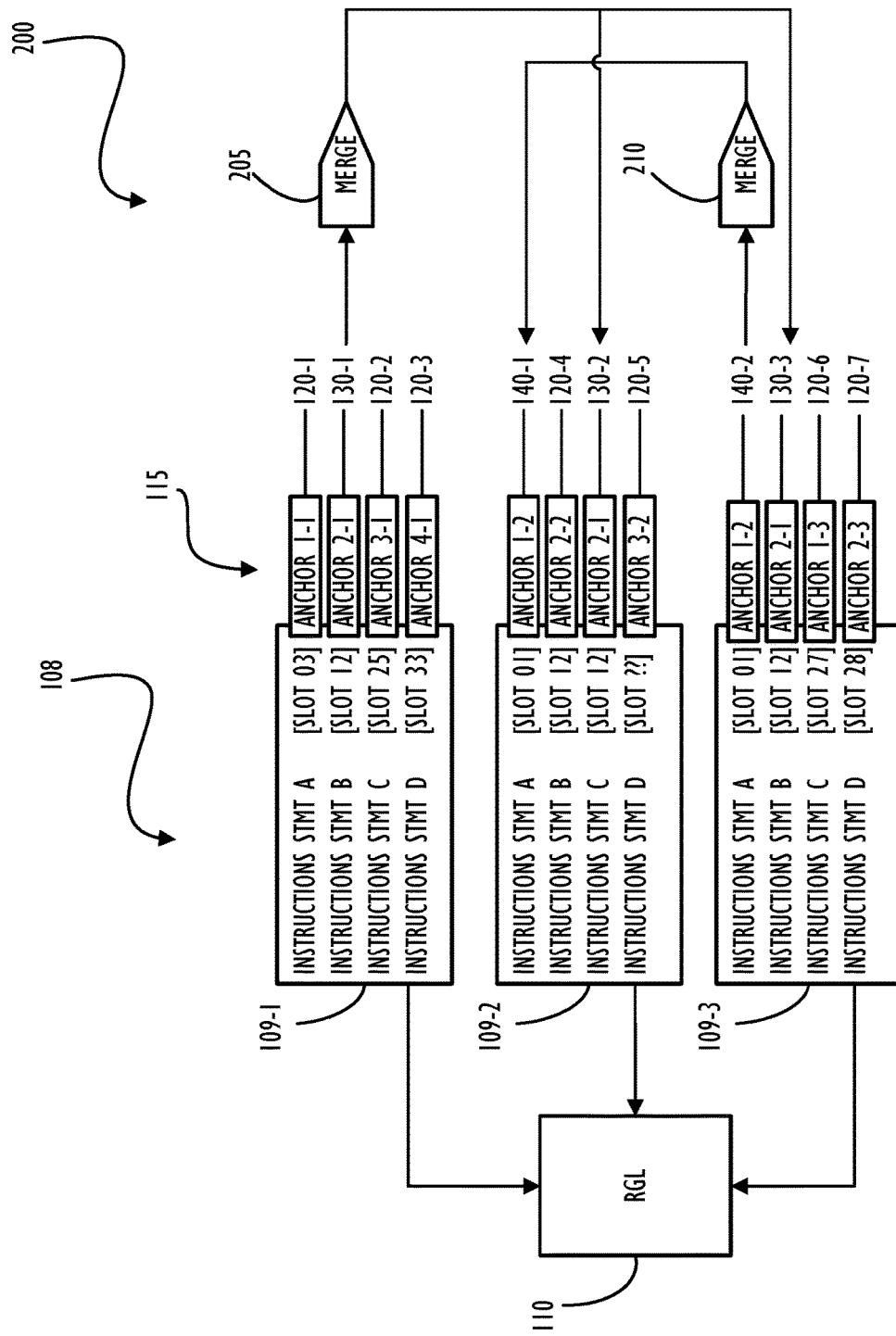
FIG. 2 is a functional block diagram representing an example of changes made to a statement in a network device configuration document and possible resultant merging of that change to similar statements in another document (e.g., another devices configuration file) based on available anchor points, according to example implementations of this disclosure.

Referring now to FIG. 2, a block diagram is shown to illustrate an example where changes to network device configuration documents 109 conforming to RGL 110 are merged with other statements in other documents having the same anchor identifier. In one example, a user may change the statement corresponding to anchor 130-1 (identified as "ANCHOR 2-1" in FIG. 2) in document 109-1. This may cause the merge process 205 (e.g., application of changes to multiple documents from a multi-edit session) to merge/apply the changes to the statement corresponding to anchor 2-1 (130-1) with the statements corresponding to anchor 2-1 (130-2) in document 109-2 and anchor 2-1 (130-3) in document 100-3. Thus, a change (e.g., edited value) may be propagated back to the appropriate area of interest and corresponding statements (corresponding by parameter setting not location) in other configuration documents.

Still referring to FIG. 2, a second example of changes to a network device configuration document is shown where a user may change the statement corresponding to anchor 140-2 (identified as "ANCHOR 1-2" in FIG. 2) in document 109-3. This change may invoke merge process 210 to merge the changes to the statement corresponding to anchor 1-2 as indicated by 140-2 with the statements also corresponding to anchor 1-2 as indicated by 140-1 in document 109-2. This example illustrates that changes can occur in an edit session (e.g., multi-edit) to invoke a merge process that propagates the changes from the editing session to statements in other applicable documents by matching statements with identical (or corresponding) anchors.

Changes to parameter settings that affect any document that has an assigned anchor that is unique across all managed documents (e.g. the anchor value is unique to a single statement in a single document) are not merged with any statements in any other documents (because there is no corresponding area of interest). An example of such statements that have a unique anchor are indicated by anchors 120-1 to 120-7.

Figure 3:
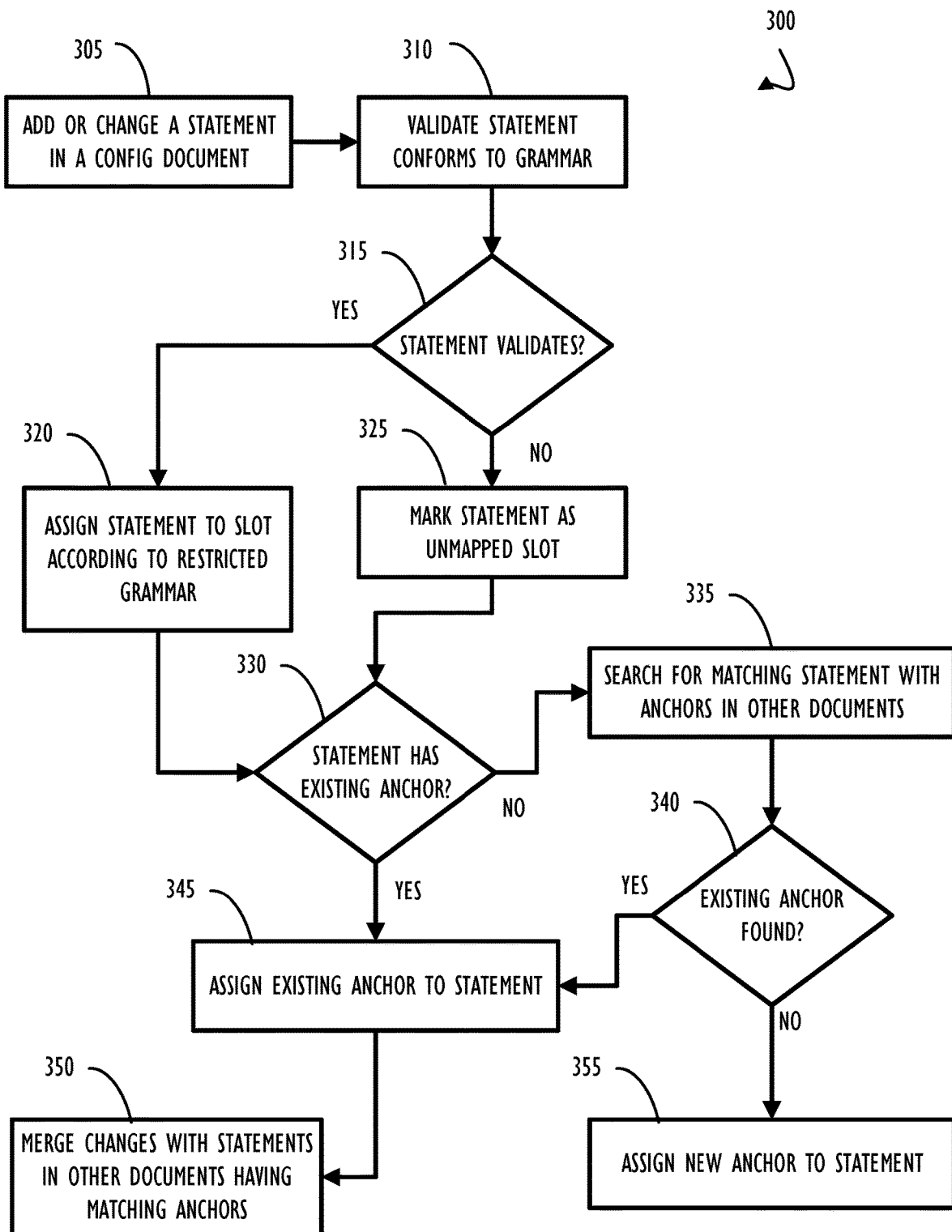
FIG. 3 is one example process illustrating validation and slot ordering of statements based on an RGL, according to one example implementation of this disclosure.

Referring now to FIG. 3, a process diagram of one example process 300 is illustrated. Example process 300 may be used to manage changes made to statements in a network device configuration document (e.g., via a multi-edit session or some other technique that includes propagation such as a scripted change). Beginning at block 305, a statement such as a configuration parameter may be added or changed in a network device configuration document. Continuing to Block 310, the statement may be checked to ensure it is valid according to an RGL. Block 315 shows a decision branch that continues to block 320 if the statement is valid according to the RGL. However, if the statement is not valid according to the RGL, the process continues to block 325.

Still referring to FIG. 3, block 320 assigns an ordering slot to the statement if the statement is valid according to the RGL. Should the statement not be valid according to the RGL, the statement is marked, in this example, as having an unmapped ordering slot. Both blocks 320 and 325 continue to decision 330 where the statement may be further evaluated for the existence of an anchor associated with the statement. If the statement has an existing anchor, the YES prong of decision 330, process flow continues to block 345. Should the statement not have an existing anchor, the NO prong of decision 330, process flow continues to block 335.

Block 335, in this example, begins a branch that searches information from the group of managed documents to find an existing anchor that can be assigned to the statement if a matching statement is found. The branch process continues to decision 340 to evaluate if the search resulted in identifying an existing anchor suitable for assigning to the statement in any other document in the group of managed documents. If no suitable anchor was found, the NO prong of decision 340, process continues to block 355 where a new anchor is assigned to the statement.

If a suitable anchor is found when evaluating the search performed in block 335 or the statement had an existing anchor in accordance with the decision branch 330, the process continues to block 345. In block 345, the anchor is assigned to the statement and the process continues to block 350. In block 350, a merge is performed among all statements with matching anchors.

Figure 4:
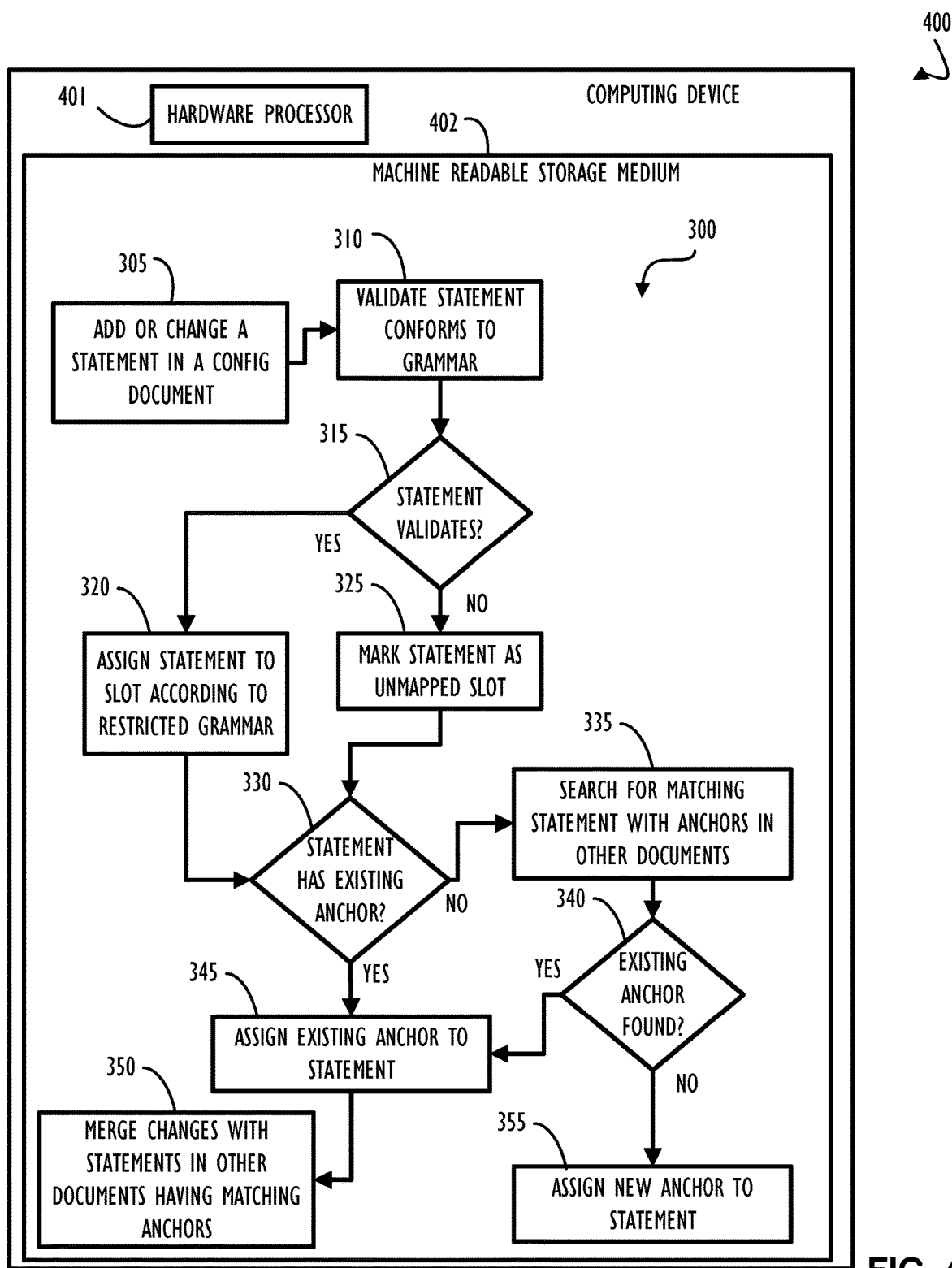
FIG. 4 is an example computing device with a hardware processor and accessible, machine-readable instructions that might be used to compile and execute a program implementing the validation and slot ordering of statements based on an RGL as outlined in FIG. 3, according to one example implementation of this disclosure.

Referring to FIG. 4, shown is an example computing device 400, with a hardware processor 401, and accessible machine-readable instructions stored on a machine-readable medium 402 that may be used to manage changes to statements in multiple network device configuration documents, according to one or more disclosed example implementations. FIG. 4 illustrates computing device 400 configured to perform the flow of method 300 as an example. However, computing device 400 may also be configured to perform the flow of other methods, techniques, functions, or processes described in this disclosure. In this example of FIG. 4, machine-readable storage medium 402 includes instructions to cause hardware processor 401 to perform blocks 305-350 discussed above with reference to FIG. 3.

A machine-readable storage medium, such as 402 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 5:
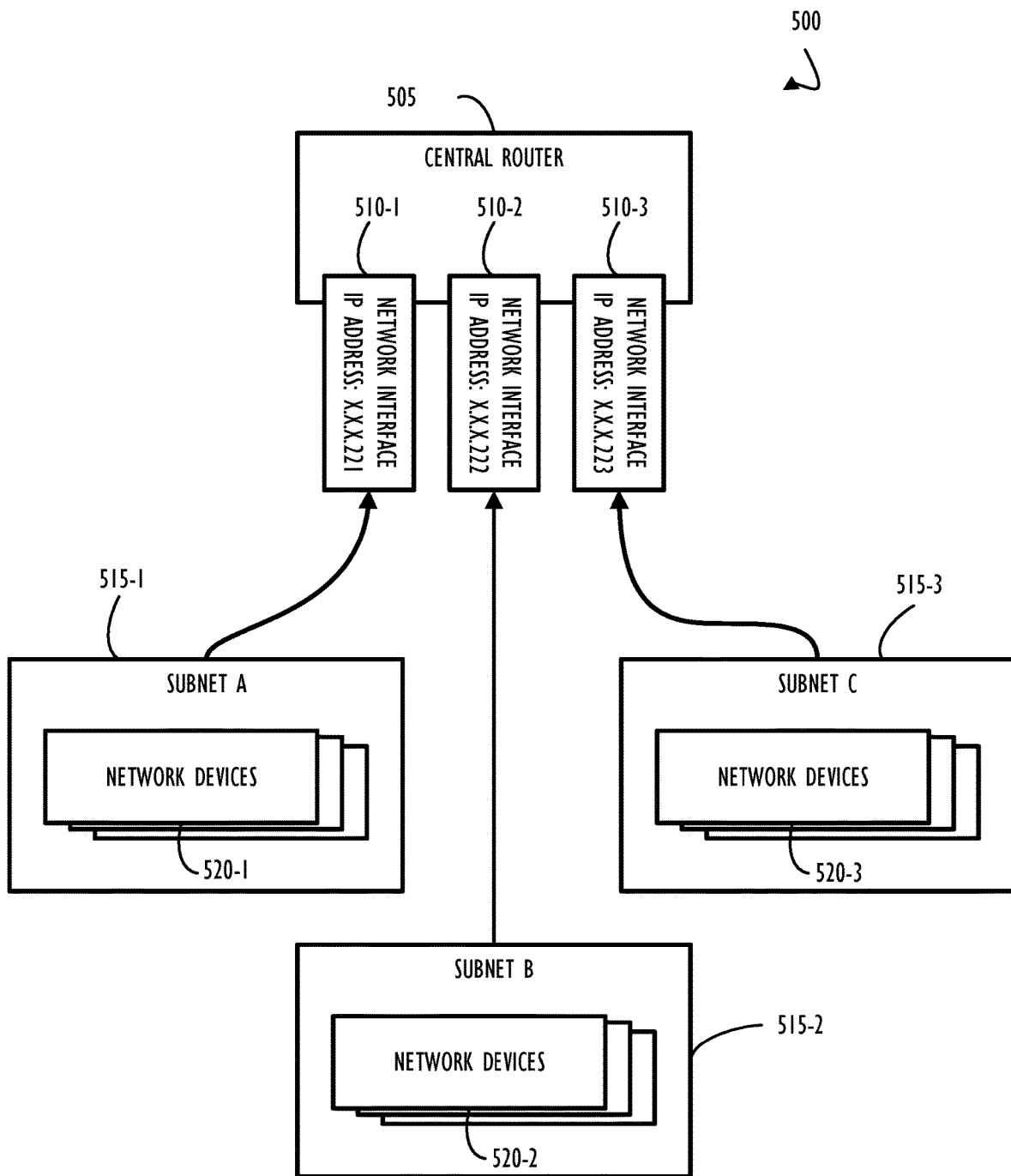
FIG. 5 is a block diagram of one example simplified corporate network where, multiple devices have similar configurations and may be managed using one or more techniques outlined in accordance with example implementations of this disclosure.

Referring to FIG. 5, an example portion of a corporate network 500 is shown consisting of a central router 505 with connected subnets 515-1, 515-2, and 515-3. To simplify the explanation of this example, a limited number of subnets, central routers, IP Addresses, and network devices are shown in the diagram. The limited number of these concepts in the diagram is not intended to limit the number of devices and subnets used when applying the techniques in this disclosure to a corporate network.

Each subnet 515-1 to 515-3 may be connected to central router 505 through a network interface 510-1, 510-2, and 510-3 dedicated to subnet 515-1, 515-2, and 515-3, respectively. A plurality of network devices 520-1, 520-2, and 520-3 may be members of corresponding subnets 515-1 to 515-3. Each network device in the plurality of devices 520-1 to 520-3 has a configuration corresponding to the device. The configuration of each device may correspond to a network device configuration document 109 as illustrated in FIGS. 1B-C, and 2. Each network device configuration document 109 may have a combination of statements corresponding to RGL 110 (FIGS. 1A-C, and 2).

Each configuration document for a network device located in a subnet may, for example, consist of zero or more statements that are exactly the same in the configuration document for each other device located in the same subnet. An example, of a statement that may be exactly the same in all configuration documents can be illustrated when devices 520-1 connected to subnet 515-1 that is connected to the central router 505 through network interface 510-1. Each network device 520-1, to function properly, is configured to send data for destinations outside of subnet 515-1 through the network interface 510-1 having the IP address X.X.X.221 in this example.

As an additional example, each configuration document for a network device located in a subnet may consist of zero or more statements that are similar to statements in configuration documents for each other device located in the same subnet. An example of a statement that may be similar across all device configuration documents in a subnet may instruct each device to assign a unique name and IP address to the device. The portion of such statements may also have a syntax corresponding to RGL 110 in FIG. 1 expressing the command to set the name or IP address that is the same across each document. The unique portion of each statement is the name or IP address that the command assigns to the network device corresponding to the configuration document. Thus, configuration documents may have identical values in some cases and portions of statements that are identical in other cases.

In this example, the above examples apply to all configuration documents for devices grouped within a subnet. Each subnet 515-1 to 515-3 having a connection to the central router 505 on a network interface 510-1 to 510-3 dedicated to each subnet further illustrates that there may be configuration documents for devices in each subnet that differ in the configuration statement that configures each network device in the subnet, with respect to where to send data with destinations outside the subnet. Where configuration, documents in subnet 515-1 are configured to send data through IP address X.XX.221, according to the above example, devices in subnet 515-2 and 515-3 would be configured differently. Devices in subnet 515-2 would send data to IP address X.X.X.222 being connected to network interface 510-2 on central router 505. Similarly, devices in subnet 515-3 would send data to IP address X.X.X.223 being connected to network interface 510-3 on central router 505.

Figure 6:
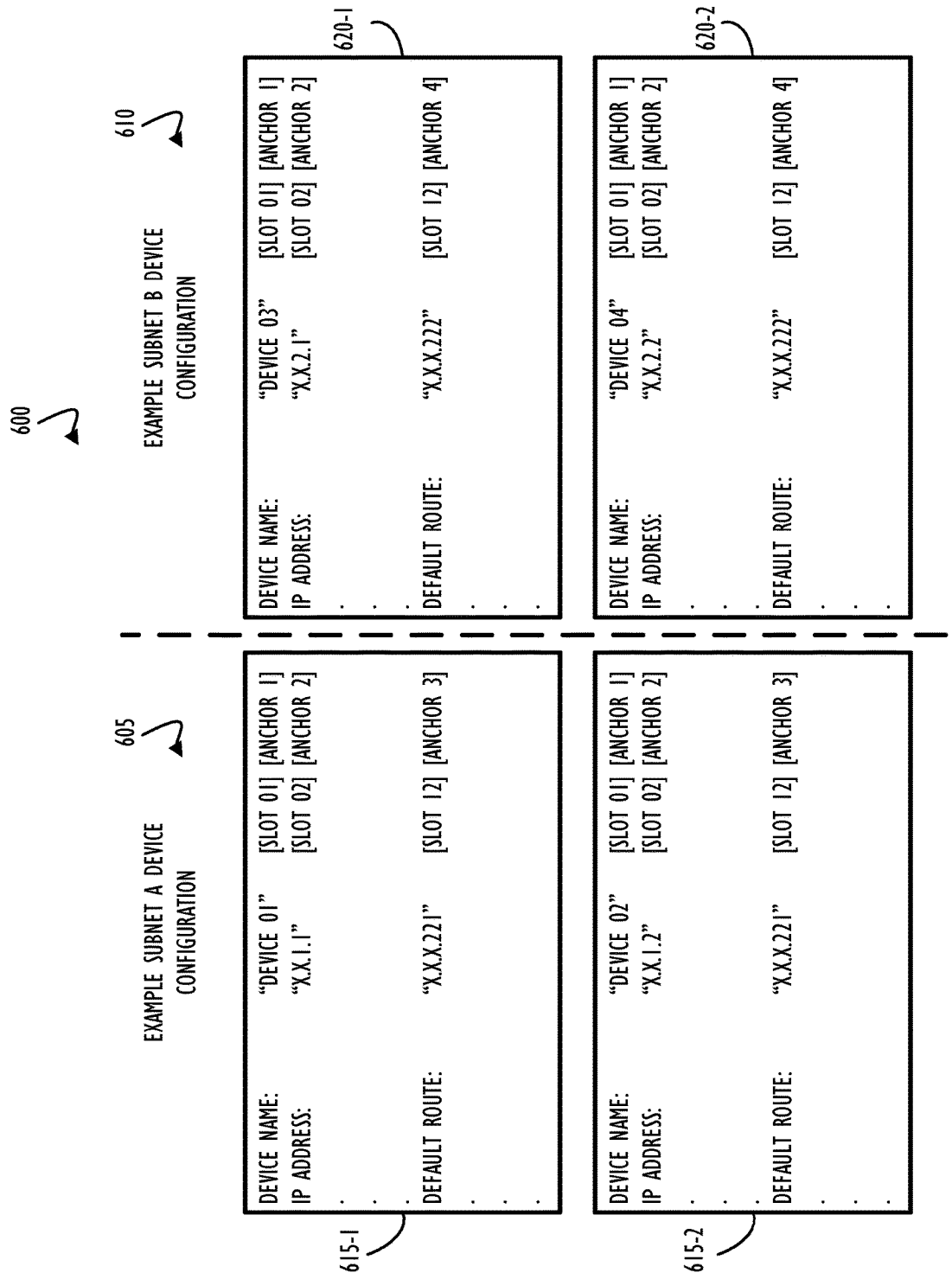
FIG. 6 is a block diagram representing an example of network device configuration documents that may be managed using one or more techniques outlined in accordance with example implementations of this disclosure.

Referring to FIG. 6, shown is an example block diagram 600 of network device configuration documents 615 and 620 that illustrate device configurations for example subnets 605 and 610. For this example, consider the documents are valid in accordance with the RGL 110 shown in FIG. 1. For purposes of the example, the number of network device configuration documents in the diagram is limited. In practice, the number of network device documents where implementations of this disclosure may be applied would be without limit.

Still referring to FIG. 6, the example "SLOT 1" statement in network device configuration documents 615-620 may configure the unique name of the device. The statement is assigned "Anchor 1" to indicate it is a similar statement and changes to the command portion of the statement (e.g. "DEVICE NAME") should be merged across all documents while the portion of the statement that is unique to each device (e.g. the name) is not modified.

Network device configuration documents 615-1 and 615-2 in this example are, configuring devices that are connected to example subnet 605. The "DEFAULT ROUTE" command in "SLOT 12" is assigned "Anchor 3" to indicate it is a similar statement. In this example, the network device configurations 615-1 and 615-2 use the same value "X.X.X.221" as each device on subnet 605 has the same value for the default route. However, the same statement in network device configuration documents 620-1 and 620-2 "SLOT 12" is assigned "Anchor 4" to indicate that changes to any document 615 would not merge to any documents 620 due to devices configured via documents 620 belonging to subnet 610. Changes to the statement in "SLOT 12" in any network device configuration document 620 would be merged with other documents 620 given the network devices belong to subnet 610. As stated above, because ordering of information within a configuration document may not be consistent across device configuration files, the combination of slots and anchor points allows for proper back merging of changes across multiple files.

Figure 7:
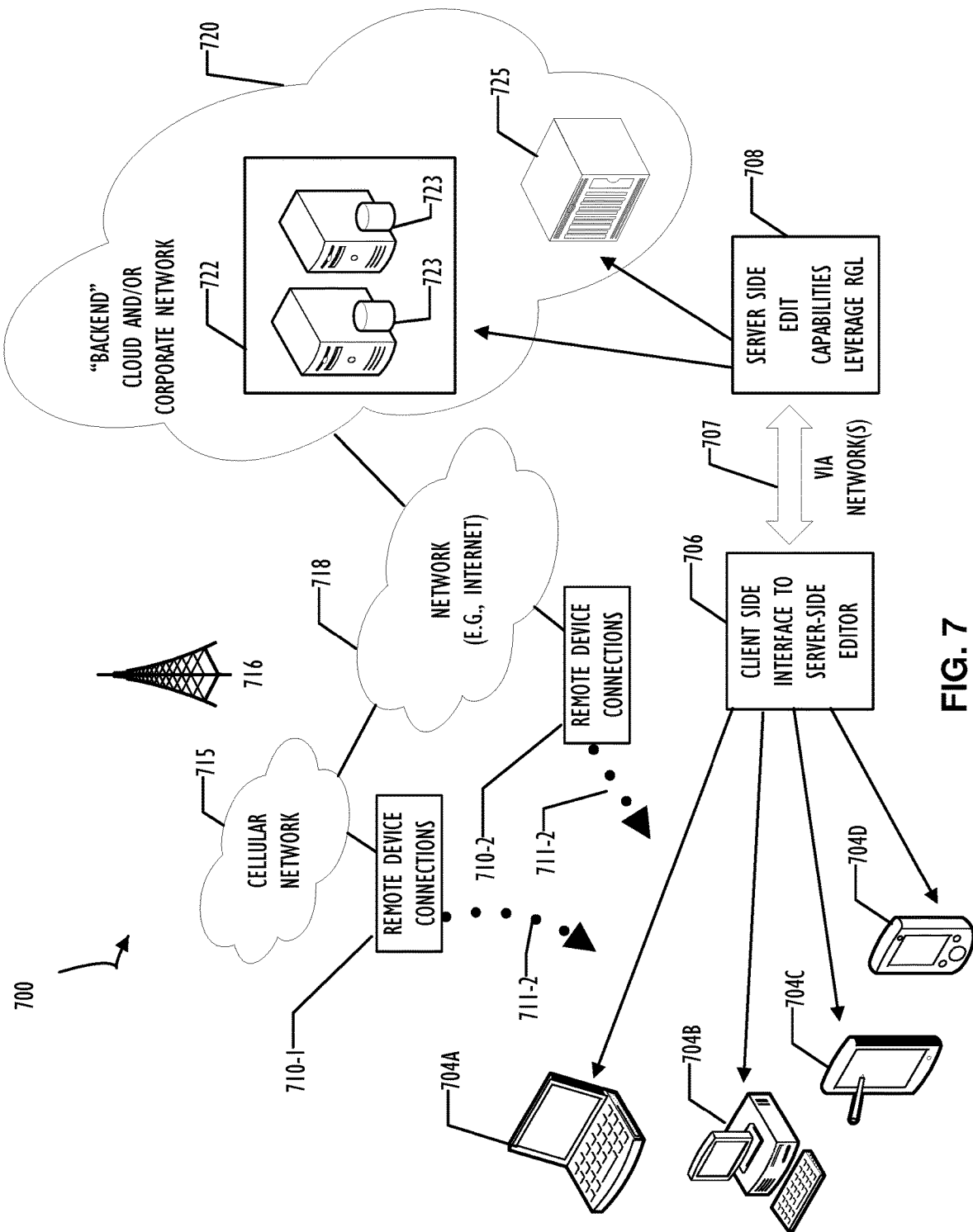
FIG. 7 is a block diagram of a client-server editing capability to optimize a client device by providing server-side support for a multi-edit capability as disclosed herein where the client device leverages functionality of the server-side multi-editor to provide end-user functionality for editing multiple configuration documents simultaneously, according to one or more disclosed implementations.

Referring now to FIG. 7, example network diagram 700 illustrates an infrastructure network with a plurality of end-user devices 704A-D that may be used to provide a user interface to a multi-editor in accordance with this disclosure. Network diagram 700 further includes cellular network 715, network 718 that may include the Internet, remote device connections for each of these networks, namely 710-1 and 710-2, respectively. These remote device connections may be wireless or wired and may be IP based or cellular based communications. Cellular network 715 may be supported by one or more cell towers 716. Backend 720 represents one or more servers that may support a backend server portion of a multi-editor designed in accordance with a client-server application model. Backend 720 is illustrated to include redundant server set 722 includes two servers 723 that may provide fault tolerance (e.g., backup) for each other and server 725 illustrated, in this example, as a standalone server. In either case, server side edit capabilities 708 is illustrated to execute on one of servers 722 or 725 in this example. Bi-directional arrow 707 indicates that communications may take place, via the illustrated networks for example, between a server side edit capabilities 708 functional module and a client-side interface 706 that may be executing on any of end-user devices 704A-D. Thus, a user may interact with different types of end-user devices to interact with a server side multi-editor in accordance with implementations of this disclosure.

Further, server side edit capabilities 708 may be RGL compliant and provide assistance to editing multiple documents simultaneously on a resource constrained end-user device. Accordingly, a resource constrained end-user device may support a web-based interface (e.g., browser) or another lightweight user interface. Optimization of data transmissions (e.g., bi-directional arrow 707) may allow a resource constrained end-user device to benefit from disclosed multi-edit capabilities utilizing anchor information to edit multiple documents simultaneously. Data from multiple documents that is identical need not be transmitted to each end-user device, instead, anchor point information may be provided based on which portion of a document is being edited on the end-user device. Upon change to any value, transmission of the change to the server side edit capabilities 708 module may include anchor point information along with the data change. Thus, the server side may then extrapolate this change and back propagate the change across many instances of configuration documents as described above. This type of implementation represents an improvement to the capabilities that may be realized on standard end-user devices to leverage other concepts of this disclosure. Additionally, an RGL (or subset thereof) may be provided to the end-user device such that the end-user device, even though possibly resource constrained, may provide just-in-time error correction and validation as outlined above. Still further, contextually aware expert information (e.g., from an RGL) may also be provided on these end-user devices with minimal overhead.

Figure 8:
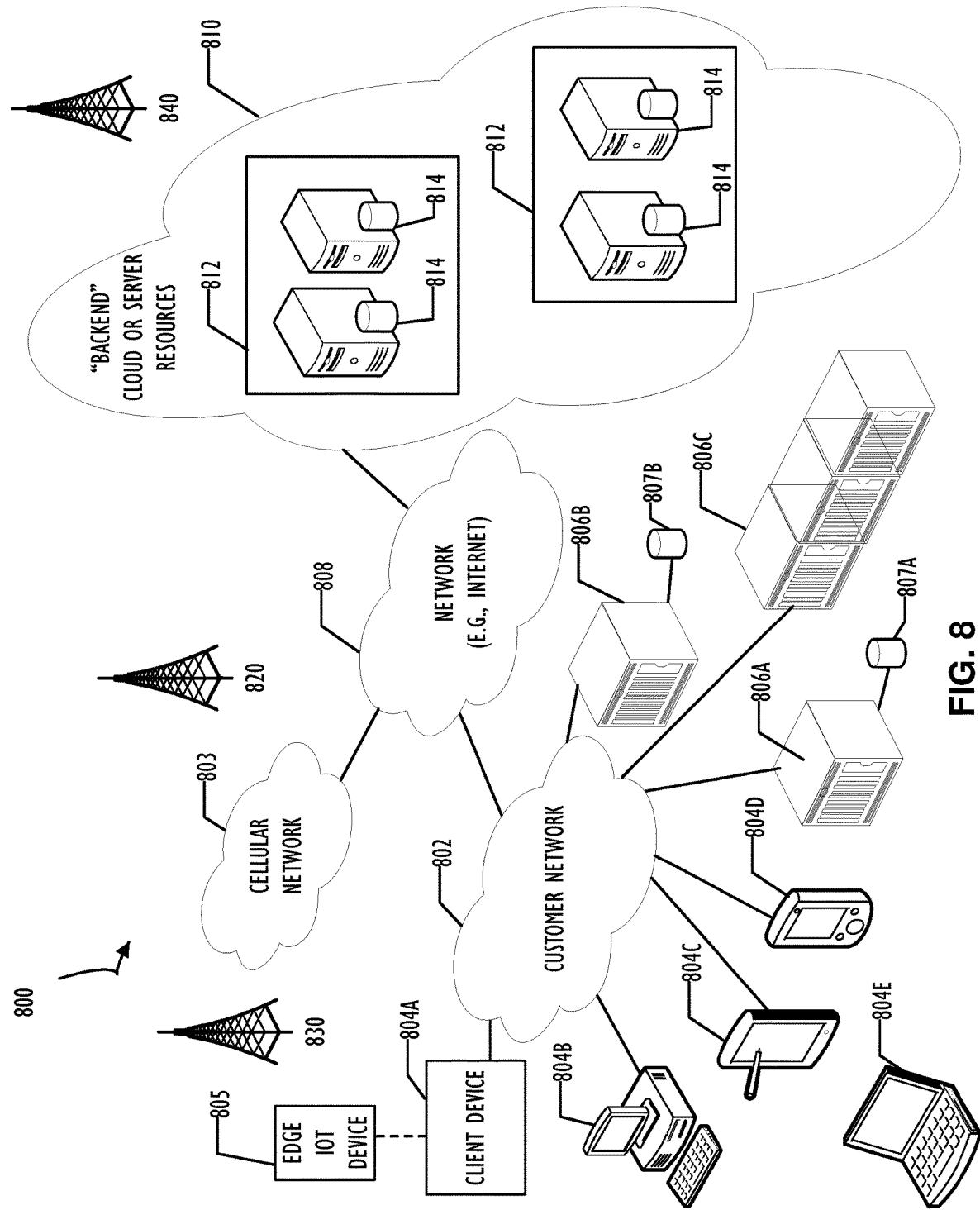
FIG. 8 represents a computer network infrastructure that may be used to implement all or part of the disclosed network device configuration document management techniques, according to one or more disclosed implementations.
Figure 9:
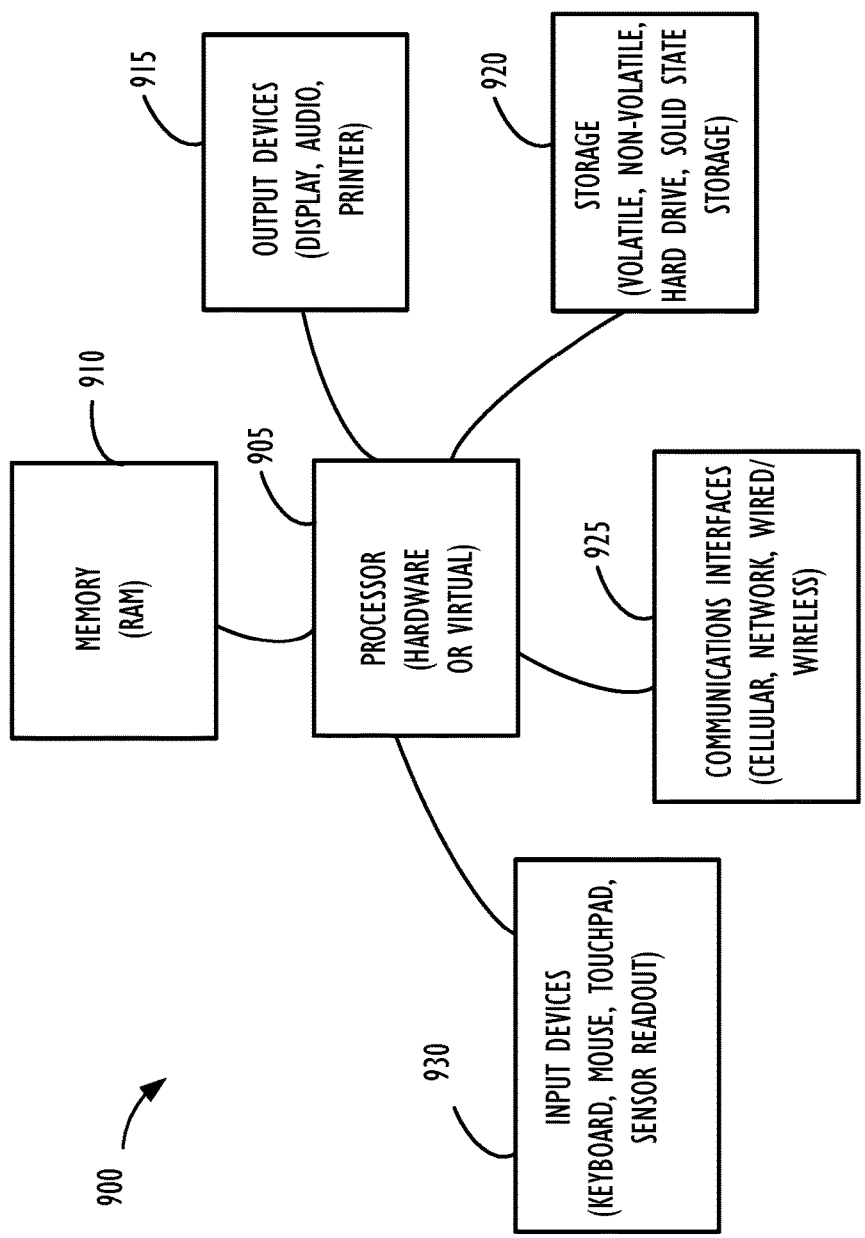
FIG. 9 illustrates a computer processing device that may be used to implement the functions, modules, processing platforms, execution platforms, communication devices, and other methods and processes of this disclosure.

FIG. 8 represents a computer network infrastructure that may be used to implement all or part of the disclosed network device configuration document management techniques, according to one or more disclosed implementations. Network infrastructure 800 includes a set of networks where examples of the present disclosure may operate. Network infrastructure 800 comprises a customer network 802, network 808, cellular network 803, and a cloud service provider network 810. In one example, the customer network 802 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another example, customer network 802 represents an enterprise network that could include or be communicatively coupled to one or more local area networks (LANs), virtual networks, data centers and/or other remote networks (e.g., 808, 810). In the context of the present disclosure, customer network 802 may include multiple devices configured with the disclosed multi-edit and management based on RGL techniques such as those described above. Also, one of the many computer storage resources in customer network 802 (or other networks shown) may be configured to store the multiple network configuration device documents 109 of FIG. 1.

As shown in FIG. 8, customer network 802 may be connected to one or more client devices 804A-E and allow the client devices 804A-E to communicate with each other and/or with cloud service provider network 810, via network 808 (e.g., Internet). Client devices 804A-E may be computing systems such as desktop computer 804B, tablet computer 804C, mobile phone 804D, laptop computer (shown as wireless) 804E, and/or other types of computing systems generically shown as client device 804A.

Network infrastructure 800 may also include other types of devices generally referred to as Internet of Things (IoT) (e.g., edge IOT device 805) that may be configured to send and receive information via a network to access cloud computing services or interact with a remote web browser application (e.g., to receive configuration information).

FIG. 8 also illustrates that customer network 802 includes local compute resources 806A-C that may include a server, access point, router, or other device configured to provide for local computational resources and/or facilitate communication amongst networks and devices. For example, local compute resources 806A-C may be one or more physical local hardware devices that are configured using the network device configuration documents according to the examples. Local compute resources 806A-C may also facilitate communication between other external applications, data sources (e.g., 807A and 807B), and services, and customer network 802. Local compute resource 806C illustrates a possible processing system cluster with three nodes. Of course, any number of nodes is possible, but three are shown in this example for illustrative purposes.

Network infrastructure 800 also includes cellular network 803 for use with mobile communication devices. Mobile cellular networks support mobile phones and many other types of mobile devices such as laptops etc. Mobile devices in network infrastructure 800 are illustrated as mobile phone 804D, laptop computer 804E, and tablet computer 804C. A mobile device such as mobile phone 804D may interact with one or more mobile provider networks as the mobile device moves, typically interacting with a plurality of mobile network towers 820, 830, and 840 for connecting to the cellular network 803. In the context of the current monitoring and event ingestion management, user alerts as to initiating of throttling actions may be configured to provide an end-user notification. In some implementations, this notification may be provided through network infrastructure 800 directly to a system administrators cellular phone.

Although referred to as a cellular network in FIG. 8, a mobile device may interact with towers of more than one provider network, as well as with multiple non-cellular devices such as wireless access points and routers (e.g., local compute resources 806A-C). In addition, the mobile devices may interact with other mobile devices or with non-mobile devices such as desktop computer 804B and various types of client device 804A for desired services. Although not specifically illustrated in FIG. 8, customer network 802 may also include a dedicated network device (e.g., gateway or router) or a combination of network devices (not shown) that implement a customer firewall or intrusion protection system. These types of devices may be configured using the multi-edit capabilities of this disclosure.

FIG. 8 illustrates that customer network 802 is coupled to a network 808. Network 808 may include one or more computing networks available today, such as other LANs, wide area networks (WAN), the Internet, and/or other remote networks, in order to transfer data between client devices 804A-D and cloud service provider network 810. Each of the computing networks within network 808 may contain wired and/or wireless programmable devices that operate in the electrical and/or optical domain.

In FIG. 8, cloud service provider network 810 is illustrated as a remote network (e.g., a cloud network) that is able to communicate with client devices 804A-E via customer network 802 and network 808. The cloud service provider network 810 acts as a platform that provides additional computing resources to the client devices 804A-E and/or customer network 802. In one example, cloud service provider network 810 includes one or more data centers 812 with one or more server instances 814.

FIG. 9 illustrates a computer processing device 900 that may be used to implement the functions, modules, processing platforms, execution platforms, communication devices, and other methods and processes of this disclosure. For example, computing device 900 illustrated in FIG. 9 could represent a client device or a physical server device and include either hardware or virtual processor(s) depending on the level of abstraction of the computing device. In some instances (without abstraction), computing device 900 and its elements, as shown in FIG. 9, each relate to physical hardware. Alternatively, in some instances one, more, or all of the elements could be implemented using emulators or virtual machines as levels of abstraction. In any case, no matter how many levels of abstraction away from the physical hardware, computing device 900 at its lowest level may be implemented on physical hardware.

As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display).

Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 9, computing device 900 includes a processing element such as processor 905 that contains one or more hardware processors, where each hardware processor may have a single or multiple processor cores. In one example, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more examples, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 9, the processing elements that make up processor 905 may also include one or more of other types of hardware processing components, such as graphics processing units (GPU), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 may be a non-transitory medium configured to store various types of data. For example, memory 910 may include one or more storage devices 920 that comprise a non-volatile storage device and/or volatile memory. Volatile memory, such as random-access memory (RAM), can be any suitable non-permanent storage device. The non-volatile storage devices 920 can include one or more disk drives, optical drives, solid-state drives (SSDs), tap drives, flash memory, read-only memory (ROM), and/or any other type of memory designed to maintain data for a duration of time after a power loss or shut down operation. In certain instances, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one example, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process events to processor 905 from storage device 920, from memory 910, and/or embedded within processor 905 (e.g., via a cache or on-board ROM). Processor 905 may be configured to execute the stored instructions or process events in order to perform instructions or process events to transform the computing device into a non-generic, particular, specially programmed machine or apparatus. Stored data, e.g., data stored by a storage device 920, may be accessed by processor 905 during the execution of computer executable instructions or process events to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 900 may comprise other components well known in the art, such as sensors, powers sources, and/or analog-to-digital converters, not explicitly shown in FIG. 9.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer system, comprising:
a network communications interface;
a memory; and
one or more processing units, communicatively coupled to the memory and the network communications interface, wherein the memory stores instructions, that when executed by the one or more processing units, cause the one or more processing units to provide a view and edit function to simultaneously view and edit multiple network device configurations, the view and edit function to:
parse a plurality of different network device configuration documents to create a set of slots and anchor points relative to locations of related parameter settings within each of the different network device configuration documents, the slots indicating a type of parameter setting and the anchor points indicating a relative location within each of the different network device configuration documents based on the slot indications;
receive an indication of a change in parameter value for a network configuration setting common to at least two files of the plurality of different network device configuration documents within a scope of an editing session;
determine a first location, using a first anchor point of a first configuration file of the at least two files, within the first configuration file to apply the change in parameter value;
determine a second location, at a different relative location than the first location within the first configuration file, within a second configuration file of the at least two files, the second location determined using the first anchor point and location of the first anchor point within the second configuration file; and
apply the change in parameter to the determined first location within the first configuration file and the determined second location within the second configuration file.

2. The computer system of claim 1, wherein the instructions to cause the one or more processing units to create the set of slots as part of the view and edit function comprise instructions to cause the one or more processing units to utilize a restrictive grammar language (RGL) definition of rules associated with a network including a first device associated with the first configuration file and a second device associated with the second configuration file.

3. The computer system of claim 2, wherein the RGL definition comprises information collected from a majority of devices having network configuration settings connected to the network.

4. The computer system of claim 3, wherein the RGL comprises information to indicate consistency for parameter values within the network that should be similarly or identically configured for all devices within the network.

5. The computer system of claim 1, wherein the memory further stores instructions to cause the one or more processors to determine locations for at least 10 configuration files using the first anchor point.

6. The computer system of claim 5, wherein the view and edit function applies the change in parameter to at least 10 devices associated with the at least 10 configuration files.

7. The computer system of claim 1, wherein the first configuration file and the second configuration file have overlapping but not identical anchor points and slots, in part, based on a first device associated with the first configuration file being a different type of device than a second device associated with the second configuration file.

8. The computer system of claim 1, wherein the first configuration file and the second configuration file have the same slots and different anchor points for at least some of the slots.

9. The computer system of claim 1, wherein the view and edit function further comprises a pre-processing function to create a restrictive grammar language (RGL) definition of rules associated with a network by correlating configuration settings from the plurality of different network devices, the RGL to identify unexpected parameter settings with respect to a majority of the plurality of different network device configuration documents.

10. A non-transitory computer readable medium comprising instructions stored thereon that when executed by one or more processing units cause the one or more processing units to:
parse a plurality of different network device configuration documents to create a set of slots and anchor points relative to locations of related parameter settings within each of the different network device configuration documents, the slots indicating a type of parameter setting and the anchor points indicating a relative location within each of the different network device configuration documents based on the slot indications;
receive an indication of a change in parameter value for a network configuration setting common to at least two files of the plurality of different network device configuration documents within a scope of an editing session;
determine a first location, using a first anchor point of a first configuration file of the at least two files, within the first configuration file to apply the change in parameter value;
determine a second location, at a different relative location than the first location within the first configuration file, within a second configuration file of the at least two files, the second location determined using the first anchor point and location of the first anchor point within the second configuration file; and
apply the change in parameter to the determined first location within the first configuration file and the determined second location within the second configuration file.

11. The non-transitory computer readable medium of claim 10, wherein the instructions to cause the one or more processing units to create the set of slots comprise instructions to cause the one or more processing units to utilize a restrictive grammar language (RGL) definition of rules associated with a network including a first device associated with the first configuration file and a second device associated with the second configuration file.

12. The non-transitory computer readable medium of claim 11, wherein the RGL definition comprises information collected from a majority of devices having network configuration settings connected to the network.

13. The non-transitory computer readable medium of claim 12, wherein the RGL comprises information to indicate consistency for parameter values within the network that should be similarly or identically configured for all devices within the network.

14. The non-transitory computer readable medium of claim 10 further storing instructions to cause the one or more processors to determine locations for at least 10 configuration files using the first anchor point.

15. The non-transitory computer readable medium of claim 10, wherein the instructions stored thereon support a change in parameter that applies to at least 10 devices associated with the at least 10 configuration files.

16. The non-transitory computer readable medium of claim 10, wherein the first configuration file and the second configuration file have overlapping but not identical anchor points and slots, in part, based on a first device associated with the first configuration file being a different type of device than a second device associated with the second configuration file.

17. The non-transitory computer readable medium of claim 10, wherein the first configuration file and the second configuration file have the same slots and different anchor points for at least some of the slots.

18. The non-transitory computer readable medium of claim 10, wherein the instructions stored thereon further comprises instructions for a pre-processing function to create a restrictive grammar language (RGL) definition of rules associated with a network by correlating configuration settings from the plurality of different network devices, the RGL to identify unexpected parameter settings with respect to a majority of the plurality of different network device configuration documents.

19. A method of implementing network device configuration parameter changes across a plurality of network communication devices based on a single edit request in a multi-edit processing function, the method comprising:
parsing a plurality of different network device configuration documents to create a set of slots and anchor points relative to locations of related parameter settings within each of the different network device configuration documents, the slots indicating a type of parameter setting and the anchor points indicating a relative location within each of the different network device configuration documents based on the slot indications;
receiving an indication of a change in parameter value for a network configuration setting common to at least two files of the plurality of different network device configuration documents within a scope of an editing session;

determining a first location, using a first anchor point of a first configuration file of the at least two files, within the first configuration file to apply the change in parameter value;

determining a second location, at a different relative location than the first location within the first configuration file, within a second configuration file of the at least two files, the second location determined using the first anchor point and location of the first anchor point within the second configuration file; and applying the change in parameter to the determined first location within the first configuration file and the determined second location within the second configuration file.

20. The method of claim 19, further comprising:

pre-processing the plurality of different network device configuration documents to create a restrictive grammar language (RGL) definition of rules associated with a network by correlating configuration settings from the plurality of different network devices, the RGL to identify unexpected parameter settings with respect to a majority of the plurality of different network device configuration documents.

* * * * *